United States Patent [19]
Bradstreet et al.

[11] Patent Number: 5,835,086
[45] Date of Patent: Nov. 10, 1998

[54] METHOD AND APPARATUS FOR DIGITAL PAINTING

[75] Inventors: John Bradstreet, Redmond; Arthur F. Champernowne, Seattle, both of Wash.

[73] Assignee: Microsoft Corporation, Redmond, Wash.

[21] Appl. No.: 979,524

[22] Filed: Nov. 26, 1997

[51] Int. Cl.$^6$ .................................................. G06F 15/00
[52] U.S. Cl. ........................... 345/326; 345/16; 345/423; 345/429; 345/475
[58] Field of Search ................................ 345/16, 17, 326, 345/339, 133, 423, 428, 429, 430, 431, 433, 475, 419; 358/298, 459, 460; 382/173, 266, 274

*Primary Examiner*—Huynh Ba
*Attorney, Agent, or Firm*—Leydig, Voit & Mayer, Ltd.

[57] ABSTRACT

A method and apparatus for painting a digital picture using strokes of a digital brush is provided. The painting strokes entered by a user is handled using a "lazy" processing approach, in which a region of the picture being painted is updated according to the entered strokes only when that region is to be displayed for viewing. To this end, the painting strokes are recorded as an ordered sequence of painting steps. The digital picture being painted is partitioned into a plurality of individual regions, and each region is assigned an age which indicates a painting step in the ordered sequence that is last applied to that region. When a region becomes visible, i.e., it is displayed for viewing, the age of the region is checked, and all of the painting steps in the ordered sequence that are after the step indicated by the age of the region are then applied to the region so that it becomes up-to-date. The age of that region is updated accordingly.

22 Claims, 11 Drawing Sheets

METHOD AND APPARATUS FOR DIGITAL PAINTING

FIELD OF THE INVENTION

This invention relates generally to computer graphics, and more particularly to painting a digital picture using digital painting strokes.

BACKGROUND OF THE INVENTION

Interactive computer graphics is the most important means of producing pictures since the invention of photography and television. With the aid of a computer, digital images can be edited to achieve a variety of effects such as changing the shapes and colors of objects, forming composite images, adding strokes of a digital paint brush, and correcting defects in the images.

One challenge constantly facing the designers of computer graphics application software is the need to reduce the amount of computer processing required to perform the graphic editing operations. Digital image editing is rather calculation-intensive. This is because a digital image typically contains from hundreds of thousands to millions of pixels. Even a simple graphic editing operation may require the modification of many pixels, and the computing time can become unacceptably long. This concern about processing efficiency is especially significant for graphics applications operating on personal computers, due to the relatively restricted processing power of such machines. Many graphics applications allow a user to paint a digital picture by applying strokes of a digital paint brush. The painting strokes are entered by using the movement of a pointing device, such as a mouse, to indicate the trace of a painting stroke. When a digital painting stroke is applied to a picture, the colors of the image pixels touched by the digital brush are modified according to the predetermined effect of the brush. For the painting process to be interactive, it is necessary to have the result of the painting stroke displayed almost immediately as the brush moves across the digital image. However, due to the potentially large number of pixels affected by a brush stroke, there are situations in which the graphic application may not be able to respond to a painting stroke in real time.

For example, it is known to store a digital picture being edited in the computer memory as a group of images that are otherwise identical but at different resolutions. An advantage of using multi-resolution images is that they are readily available for display when the user selects to view the painted picture at one of the image resolutions. The use of multi-resolution images, however, may result in unacceptably slow response of the graphic application. When an editing step is applied by the user to the image displayed on the video display, all of the multi-resolution images have to be modified accordingly so the images remain compatible. Due to the different resolutions of the images, if the user applies a painting stroke in the lowest-resolution image, a very large number of pixels in other images have to be modified to keep the images up-to-date. The large amount of computer operations required to update the images may cause a computer of relatively modest processing power to yield unacceptably slow response.

SUMMARY OF THE INVENTION

In accordance with the invention, a method and apparatus for painting a digital picture using strokes of a digital brush is provided. In accordance with the invention, the responsiveness and processing efficiency of the graphic application are significantly enhanced by using a "lazy" processing approach, in which a region of he digital picture is updated according to the digital painting strokes entered by the user only when that region is to be displayed for viewing. To this end, the painting strokes are recorded as an ordered sequence of painting steps. The digital picture being painted is partitioned into a plurality of individual regions. Each region in the digital picture is assigned an age which indicates a painting step in the ordered sequence that was last applied to that region. When a region becomes visible, i.e., it is displayed for viewing, the age of the region is checked. All of the painting steps in the ordered sequence that are after the step indicated by the age of the region are then applied to the region so that it becomes up-to-date. The age of that region is also updated accordingly.

Additional features and advantages of the present invention will become apparent with reference to the following detailed description when taken in conjunction with the drawings in which:

Figure 1:
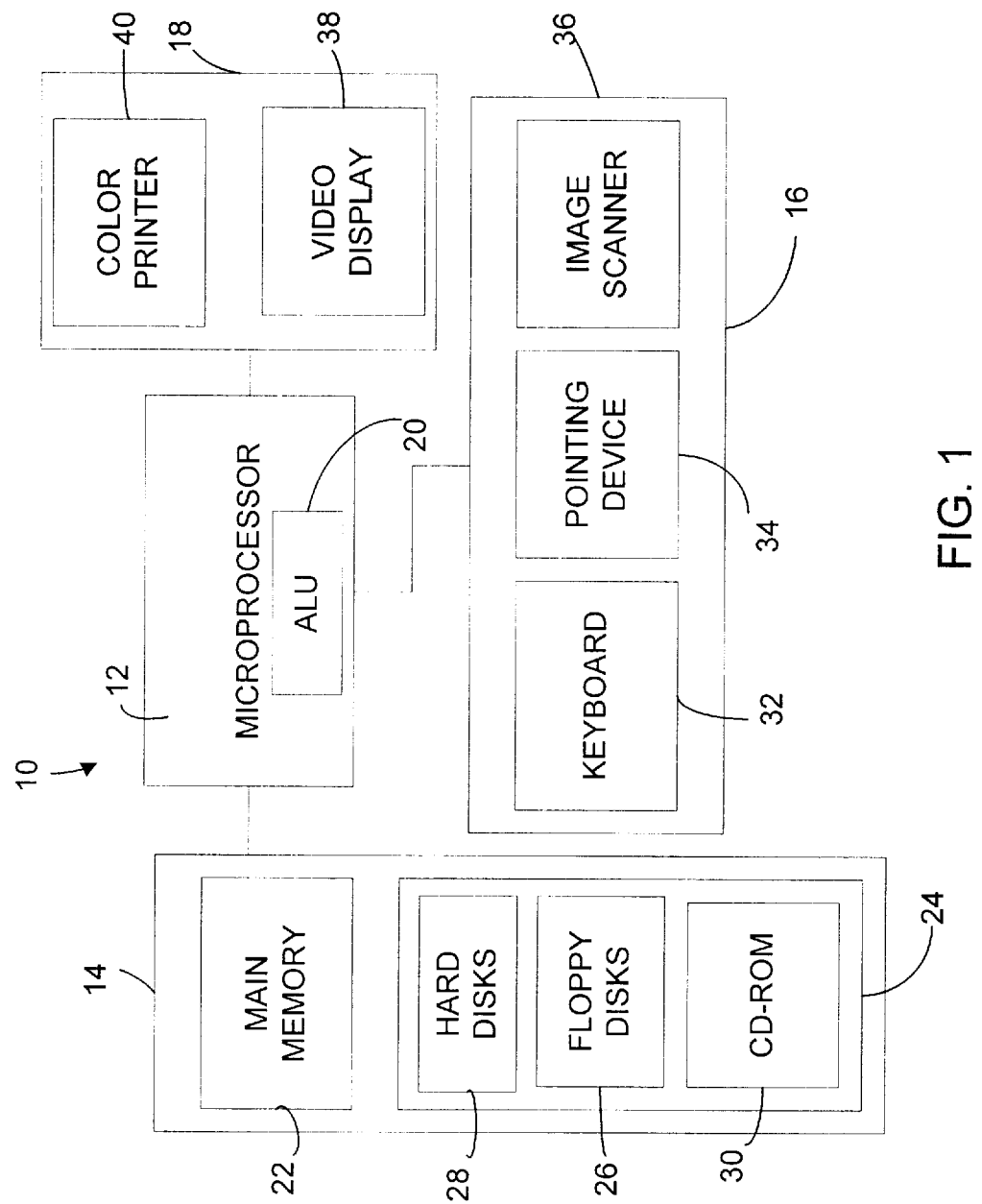
FIG. 1 is a block diagram of a computer system that may be used to implement a method and apparatus for digital painting in accordance with the invention.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the invention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 shows an exemplary computer system for implementing an embodiment of the present invention. The computer 10 includes a microprocessor 12, a memory system 14, input devices 16 and output devices 18.

The microprocessor 12 is of familiar design and includes an ALU 20 for performing arithmetic and logic computations. The microprocessor 12 may have any of a variety of architectures known to those skilled in the art.

The memory system 14 generally includes a high-speed main memory 22 in the form of random access memory (RAM) which will be used by the microprocessor in the graphic editing process. The memory system further includes secondary storage 24 which may be used for long-term storage of graphic editing applications and digital images. The secondary storage typically includes floppy disks 26, hard disks 28, CD-ROM 30, and may contain a variety of alternative storage components having a variety of storage capacities.

The input devices 16 may include familiar components such as a keyboard 32 and a pointing device 34 (e.g., a mouse). For digital painting purposes, the pointing device 34 may be used to apply digital painting strokes. More particularly, the movement of the pointing device 34 is sensed by the microprocessor 12 and used to define the trace of a painting stroke. The computer system may include other devices for inputting digital images, such as a color image scanner 36. The output devices 18 may also include a variety of different components. For computer graphics applications, the output devices may include a color video display 38 on which an image being edited can be displayed for viewing, and a color printer 40 for producing a hard copy of the digital image.

The present invention is generally directed to an efficient way to implement a digital painting process on a computer. Digital painting generally involves a sequence of modifications of the colors of local areas of a digital image. The modifications to be performed are typically specified by user-entered strokes of a digital "brush." When the digital brush is applied to a digital image along a trace specified by the movement of the pointing device 34, the colors of the image pixels "touched" by the brush are modified according to the predefined attributes of the brush. The effect of a digital brush is often, but not exclusively, designed to mimic the effect of drawing with a felt pen, pencil, crayons paint brush, or a paint sprayer, etc. Unless otherwise specified in the context, the term "digital painting" as used herein is intended to be broadly construed to cover all of the different painting effects based on the movement of a given digital brush across the image being painted.

Figure 2:
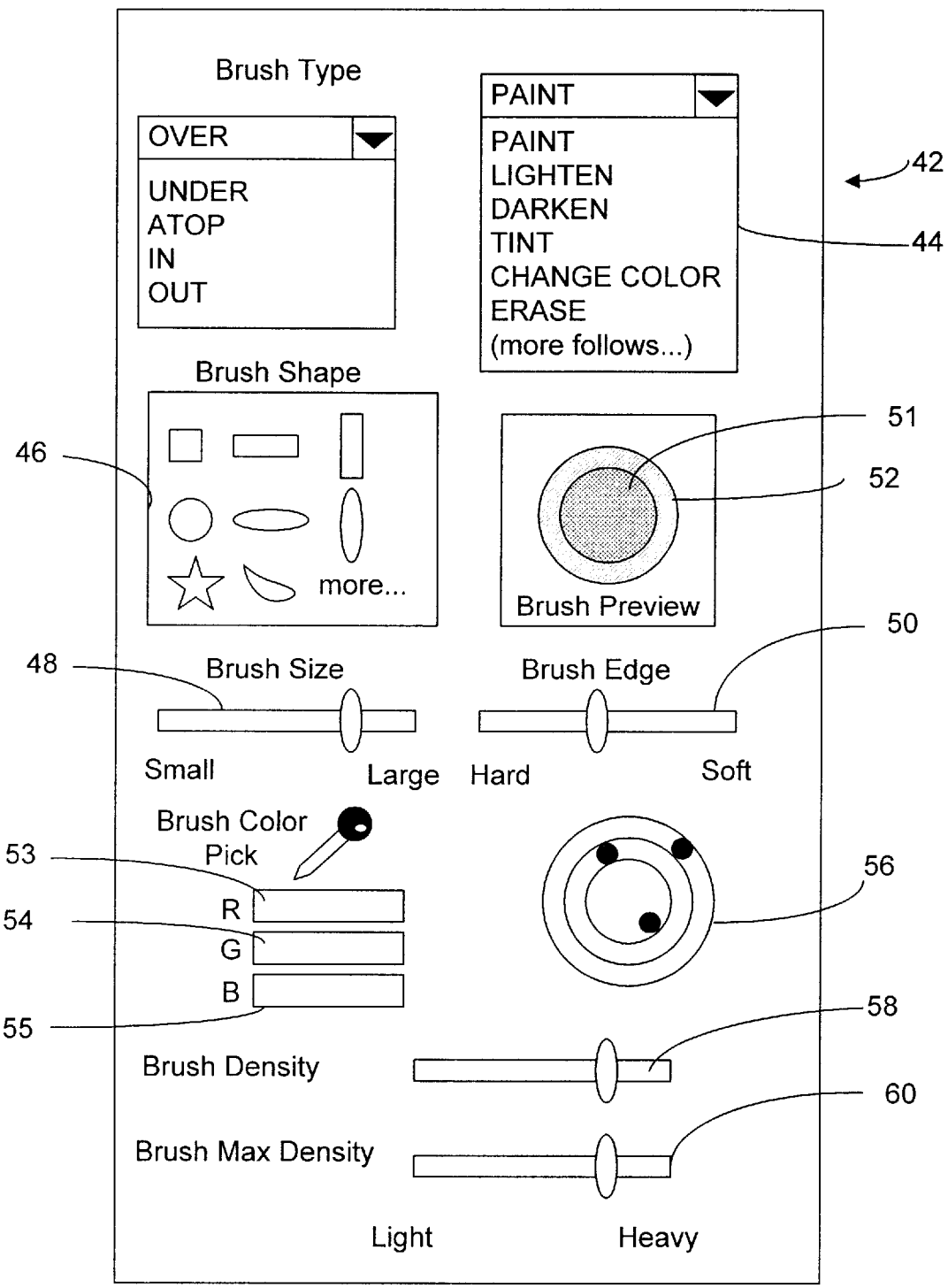
FIG. 2 is an illustration of an exemplary brush selection window for allowing a user to select a paint brush for use in the painting process.

Some examples of different digital paint brushes can be inferred from the brush selection window 42 in FIG. 2. The brush selection window 42 allows the user of the graphic application to select the attributes of the digital brush to be used in the painting process. In the illustrated embodiment, the paint effect box 44 provides selections of painting effects on a pixel touched by the brush. Such effects include, for example, applying a preselected paint color, lightening or darkening the color of the pixel, changing the tint or color, or erasing the color of the pixel, etc. As illustrated in the brush shape selection box 46, typically a variety of brush shapes, such as square, rectangular, round, elliptical, and other non-geometric shapes are offered. The brush size selection bar 48 allows the user to adjust the size of the brush in terms of the number of pixels covered by the brush. The brush edge selection bar 50 is used to select how soft or hard the edge 52 of the brush 51 should be. The illustrated embodiment also allows the user to select the color of the brush by specifying the red (R), green (G), and blue (B) intensities using the R,G,B boxes 53, 54, 55, or by using the color wheel 56 to adjust the tint of the paint. The brush density selection bar 58 allows adjustment of the color density of the brush, and the brush maximum density selection bar 60 allows the maximum density for the paint brush to be set. It will be appreciated that the types of brushes and adjustments shown in FIG. 2 are provided only as an example, and are by no means intended to restrict the application of this invention.

Figure 3:
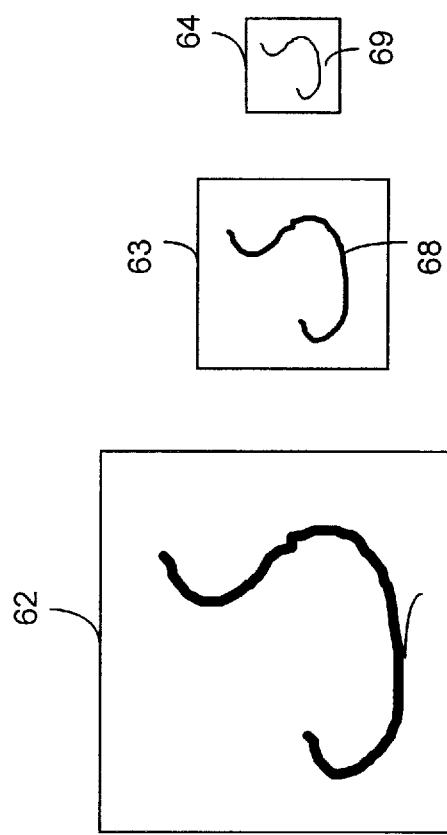
FIG. 3 is an illustration of a digital picture stored in a multi-resolution format as correlated images at different resolutions.
Figure 3:
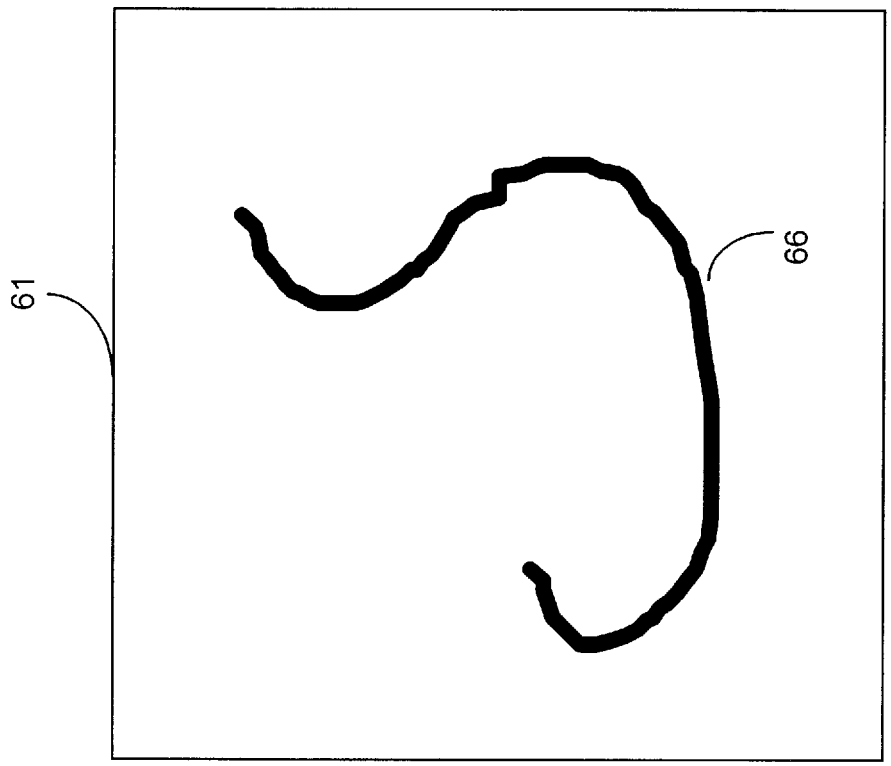

For illustration purposes, the invention will be described using an embodiment in which a digital picture being painted is stored in the computer memory in a multi-resolution format. More particularly, the picture is stored as a plurality of correlated digital images at incrementing orders of resolutions. FIG. 3 shows an example of such a set of multi-resolution images 61–64 for a digital picture. The resolutions of two adjacent images in the set differ by a factor of two (2) in both spatial directions. The painted elements 66–69 in the images are otherwise identical but represented at the resolutions of the respective images.

When multi-resolution images are used for graphic editing, the user may view any of the images on the video display and work on that displayed image such as by applying painting strokes. When the image being viewed is modified, the other images of higher or lower resolutions need to be modified correspondingly. Accordingly, each painting stroke entered by the user is actually applied multiple times at different resolutions so that the images at those resolutions remain compatible. If the user applies a painting stroke to the lowest-resolution image 64 when it is viewed on the video display, the number of pixels affected by the stroke in the highest-resolution image 61 would generally be sixty-four times of that in the lowest resolution image. Thus, even a simple stroke of a small brush in the lowest resolution image 64 would require the modification of a large number of pixels in the highest-resolution image. If the graphic application is designed to update all of the multi-resolution images in response to each movement of the paint brush, the response of the application can become unacceptably slow due to the large amount of calculations required to update the images.

In accordance with the invention, the efficiency and response of the graphic application in handling the digital painting process are significantly enhanced by using a "lazy" approach in modifying the images according to the painting strokes entered by the user. The term "lazy" as used herein refers to the type of data flow architecture which processes the data to produce a result only when the result is required.

More particularly, in accordance with this invention, an image being painted is divided into a plurality of individual regions, and painting strokes are applied to a region of the picture only when that region becomes visible. In other words, the region is modified according to the painting stroke only when it becomes necessary to modify that region to present an up-to-date representation for viewing by the user. By performing the calculations for updating an image region only when it is necessary for viewing, significantly fewer pixels may have to be modified in response to each brush movement. For example, if a brush stroke is entered when the lowest-resolution image 64 is being viewed, only that image is modified in real time by the brush stroke, while the other images 61–63 at higher resolutions are not modified until they become visible. As a result, the response of the graphic application to painting strokes is made significantly faster.

In accordance with the invention, the lazy painting scheme as described above is advantageously used to handle digital painting using "local" brushes. The term "local" means that the painting effect on a pixel touched by the brush stroke can be rendered without reference to any other pixel of the image. In the digital painting process, the result of a stroke of a brush depends not only on the brush and the stroke but also on the previous state of the image. It is therefore in general the case that the effect of a series of brush strokes depends on the strokes being executed in the correct order. With local paint brushes, painting strokes can be applied to different regions in the correct order by updating only the regions being viewed. In contrast, if a non-local brush is uses, the portions of the image that affect the stroke of the non-local brush may not lie in the viewing portion of the image. In that case, in order to correctly apply the non-local brush stroke, the portions that affect the stroke but are not being viewed have to be updated first. In the following description of the invention, it is assumed that local digital brushes are used.

In accordance with a feature of the invention, to implement the lazy painting scheme, each image being painted is partitioned into a plurality of individual regions, and each region is assigned an age which indicates to which extent that region was last modified. Thus, when that region becomes visible, all portions of the painting strokes that are "younger" (i.e., not yet applied to that region) are applied to that region, and its age is accordingly updated.

Figure 4:
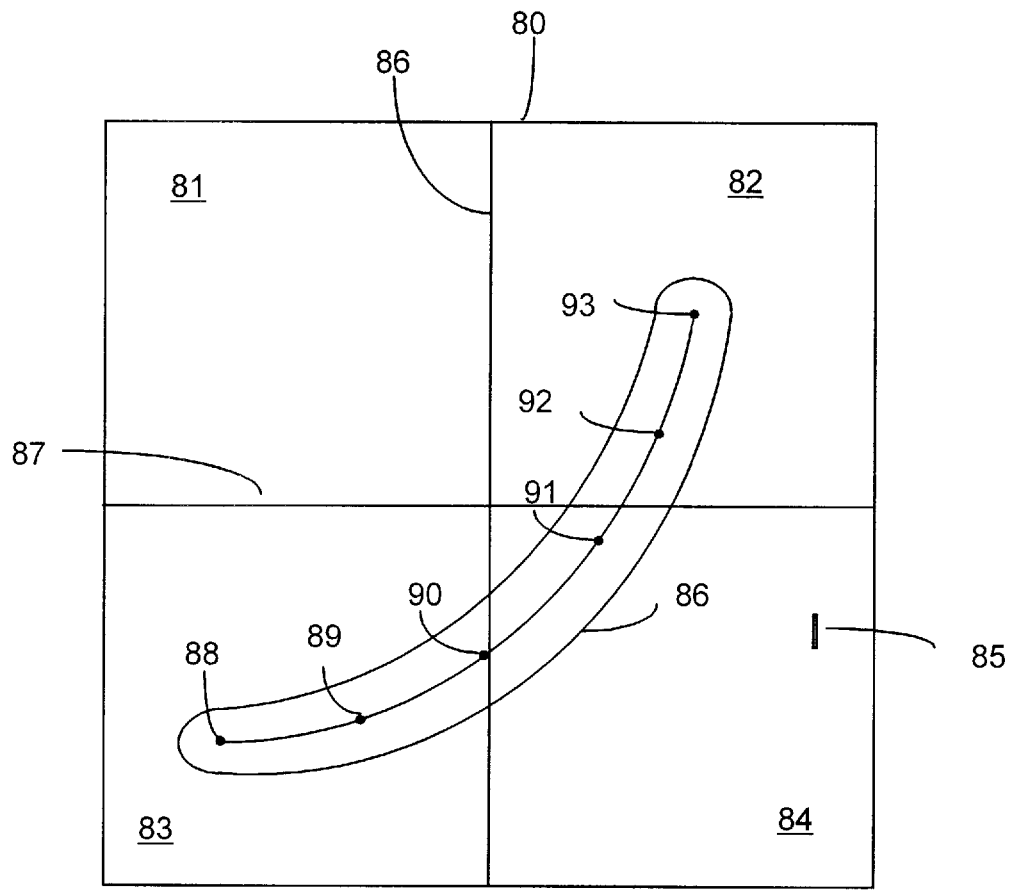
FIG. 4 is a schematic illustration of a painting stroke applied to a digital image.

FIG. 4 shows as an example an image 80 which is partitioned into different regions, and an enlarged view of a brush stroke 86 applied to that image. In the preferred embodiment, an image being painted is divided into square or rectangular tiles of a given size in terms of the number of pixels included. For example, the image 80 in FIG. 4 has four tiles 81–84. For illustration purposes, a pixel 85 in one tile is also shown. The size of the tiles is generally a design choice, and may vary from one pixel to many pixels. The partition lines 86, 87 separating the tiles in FIG. 4 and similar partition lines in other Figures described below are shown only for illustration purposes and are generally not displayed for viewing by the user.

To accurately keep track of the order of the painting strokes, in the present embodiment the painting strokes entered by the user are recorded as an ordered sequence of sub-stroke brush movement steps. As shown in FIG. 4, the stroke 86 in the image is specified by a sequence of points 88–93, including a starting point 88 and an end point 93, along a center trace 96 of the paint brush stroke 86. The paint brush stroke is recorded by storing the locations of these stroke points. When the painting stroke is applied to the image, the trace 96 of the paint brush is determined according to the points 88–93, and the colors of the pixels touched by the brush moving along the trace are modified according to the attributes of the paint brush used.

Figure 5:
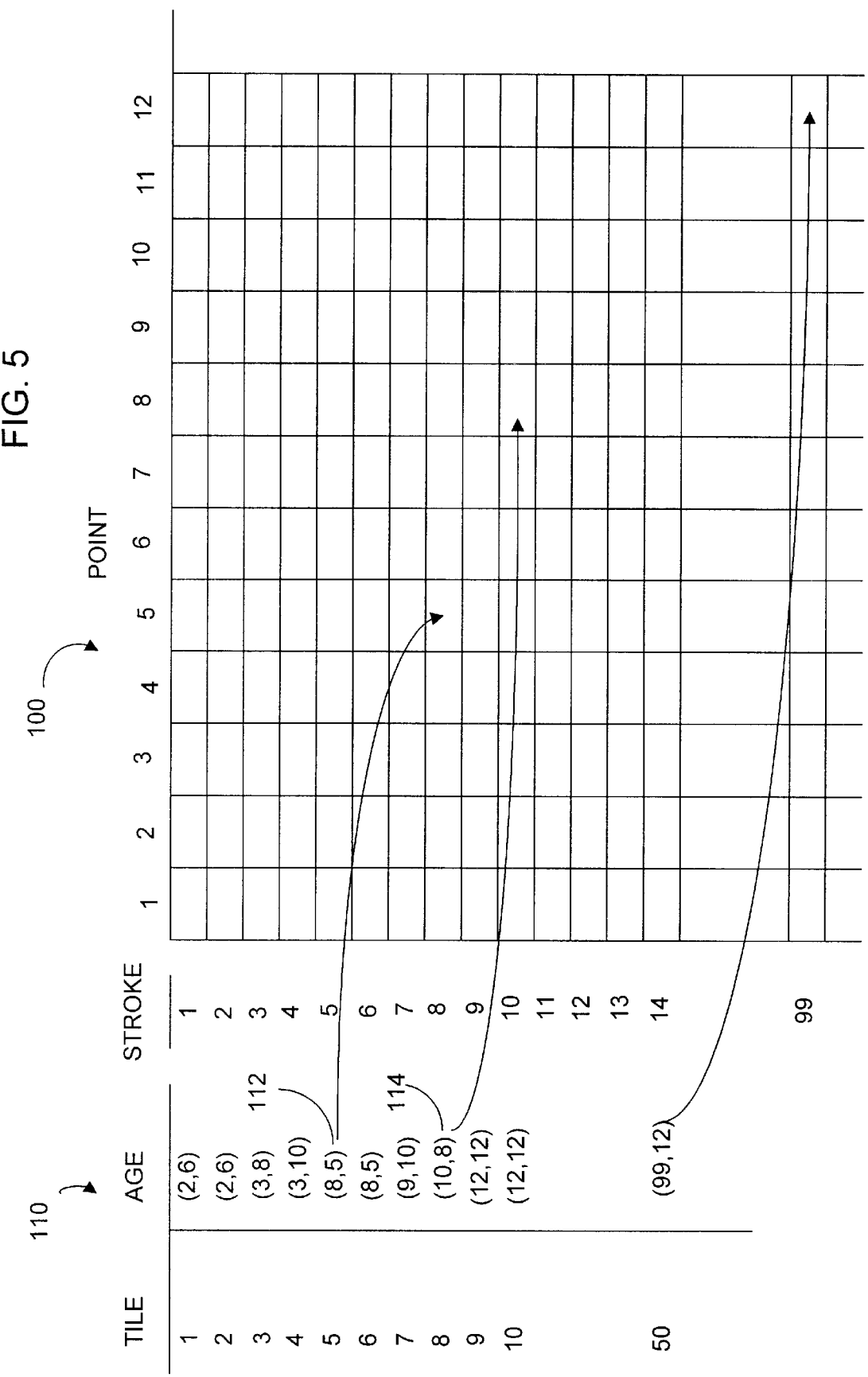
FIG. 5 is a diagram showing a data structure for recording painting strokes and storing the ages of tiles in a digital image.

FIG. 5 shows one possible data structure for recording the brush strokes and the ages of different tiles. As shown in FIG. 5, the series of brush strokes entered by the user in the painting process is recorded in a brush stroke table 100 in the computer memory. As described above, each stroke is recorded as a plurality of points. For each point of a stroke there is an entry in the brush stroke table which stores the location of that point.

For each image involved in the painting process, an age table 110 is set up in the computer memory which stores the ages of the tiles in the image. The age of each tile identifies the stroke point that is last applied to that tile. For instance, in the illustrated embodiment, the age record 112 of tile No. 5 is stated as (8,5), which indicates that the tile has been modified up to stroke 8, point 5. Similarly, the age record 114 of tile No. 8 is (10,8), which corresponds to stroke 10, point 8. If tile No. 5 becomes visible in the painting process, its age record is checked, and all of the stroke points in the brush stroke table that are "younger" than point 5 of stroke 8 are applied to the pixels in tile No. 5 so that tile No. 5 is up-to-date. The age of tile No. 5 is also modified to indicate the point and stroke that is last applied to the tile. For example, if the last stroke point entered by the user is point 12 of stroke 99, then all of the stroke points after stroke 8, point 5 and up to stroke 99, point 12 are applied to tile No. 5, and the age of that tile is updated to (99,12).

To further illustrate the lazy painting process of the invention as implemented in the preferred embodiment, FIGS. 6A–6D show the evolution of a picture 150 in a painting process. The picture 150 is stored in a multiple resolution format. For simplicity of illustration, only two images of resolutions different by a factor of two are shown. The lower-resolution image 152 includes four tiles 160–163, and the higher-resolution image 154 includes sixteen tiles 200–215. The age of each tile is given inside the tile in the format of (m,n) where m refers to the stoke number and n refers to the point number. Before any brush stroke is applied to the images, the ages of the tiles would be (0,0).

Figure 6A:
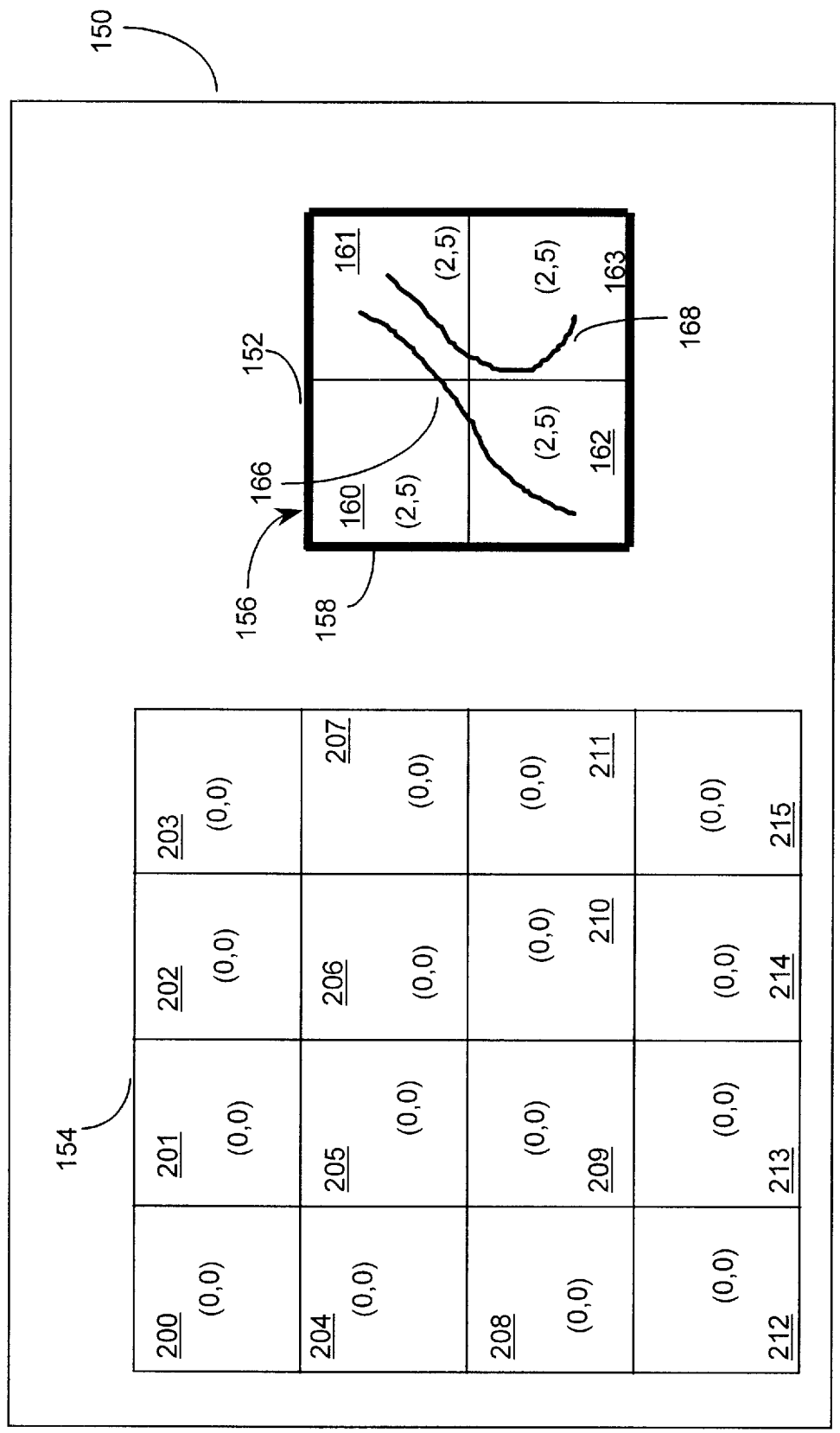
FIG. 6A is a schematic illustration of a picture being painted which includes a lower-resolution image and a higher-resolution image partitioned into a plurality of tiles.

In the example of FIG. 6A, the lower-resolution image 152 is first viewed on the video display. Thus, the viewing portion 156 of the picture, which is indicated as the portion enclosed in the bold rectangular box 158, initially includes the lower-resolution image 152. Also illustrated in FIG. 6A, two strokes 166, 168 have been applied to the lower resolution image. Because the lower-resolution image 152 is in the viewing portion 156, each tile in that image is modified according to the two brush strokes so that they are up-to-date. Thus, assuming that the second stroke 168 has five (5) points, the age of the each tile in the lower-resolution image 152 is shown as (2,5), corresponding to the last point of the second stroke.

One the other hand, the higher-resolution image 154 is not being viewed. In accordance with the invention, the first two painting strokes 166, 168 are not applied to the higher-resolution image. Accordingly, the ages of the tiles 201–215 in the higher-resolution image 154 remain (0,0).

Figure 6B:
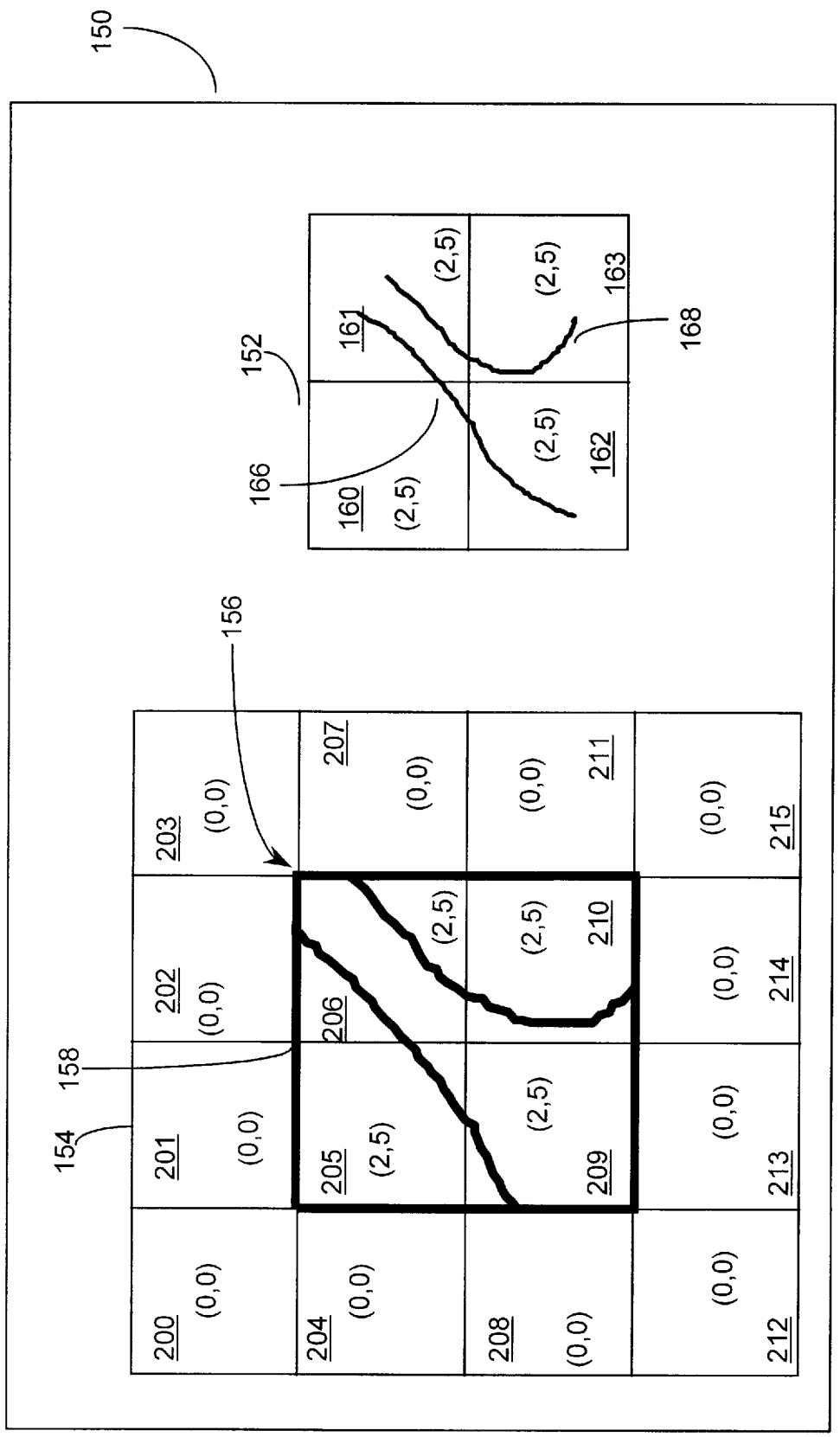
FIG. 6B is an illustration of the digital picture of FIG. 6A with a viewing portion of the picture moved from the lower-resolution image to the higher-resolution image.

Turning now to FIG. 6B, in this example the user has selected to view the higher-resolution image 154, such as by using a "zoom" feature. Because of its higher resolution, only a portion of the higher-resolution image 154 is included in the viewing portion 156 as identified by the bold rectangular box 158. The tiles 205, 206, 209, 210 are now visible, and they are updated by applying all points of the first two strokes. The ages of the tiles are accordingly updated to (2,5). The other tiles in the image 154 that are not being viewed are not modified, so that their ages remain (0,0).

It will be appreciated that the application of a given painting stroke to a tile does not necessarily require the modification of the color of any pixel in that tile, because the brush movement of the painting stroke many not touch the pixels in that tile. Preferably the graphic application is implemented such that in updating a tile the application checks whether the tile is affected by a given paint stroke. If not, the application simply updates the age of the tile without modifying any pixel in that tile.

Figure 6C:
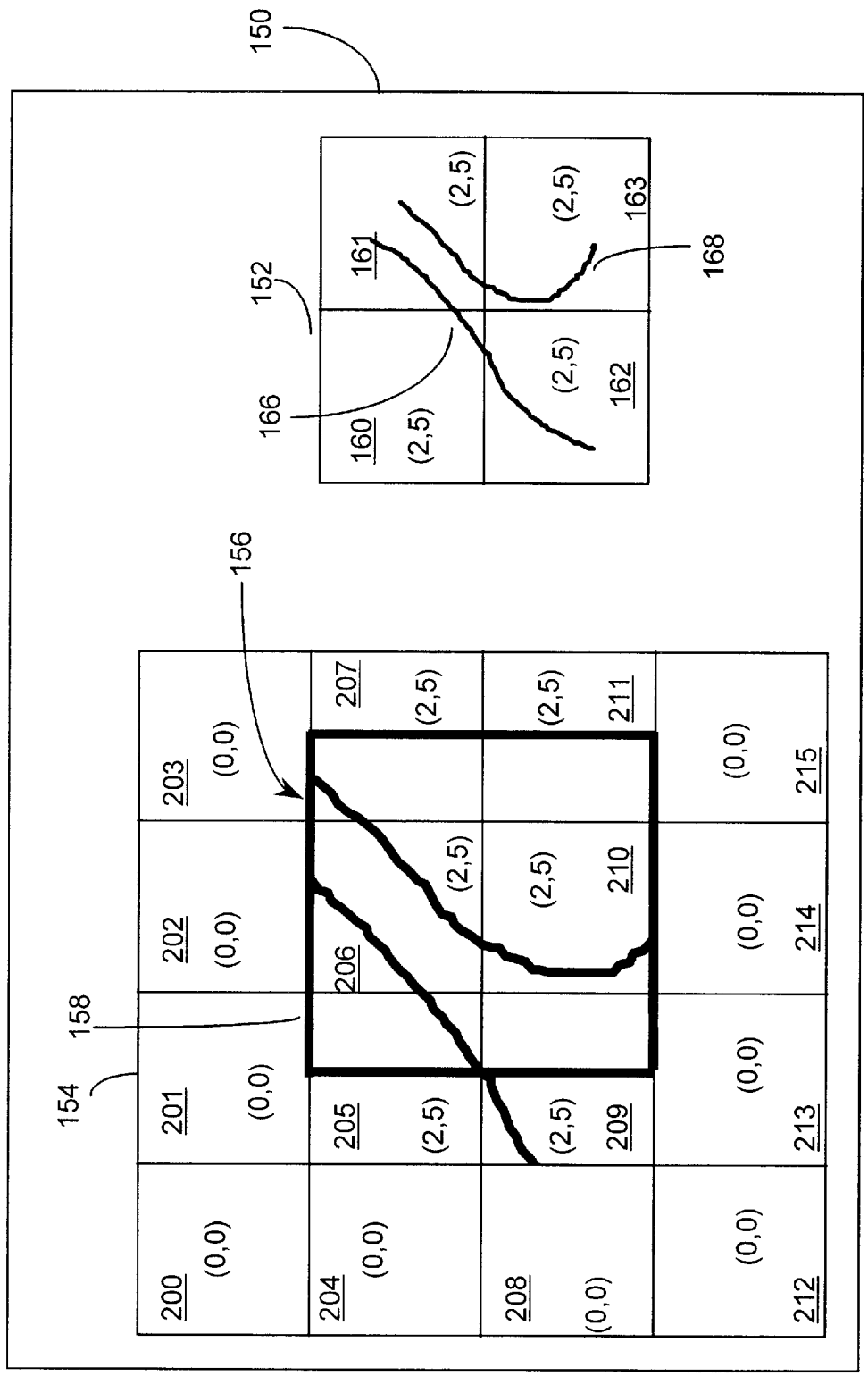
FIG. 6C is an illustration of the digital picture of FIG. 6B with the viewing portion shifted to cover a different portion of the higher-resolution image.

Turning now to FIG. 6C, in this example the user has shifted the viewing portion 156 in the high resolution image 154 such that the viewing portion now includes tiles 205–207, 209–211. Some of these tiles are only partially visible. Nevertheless, the tiles are updated in their entirety.

Accordingly, the existing two strokes 166, 168 are applied to the newly visible tiles 207, 211, and their ages are accordingly changed to (2,5).

Figure 6D:
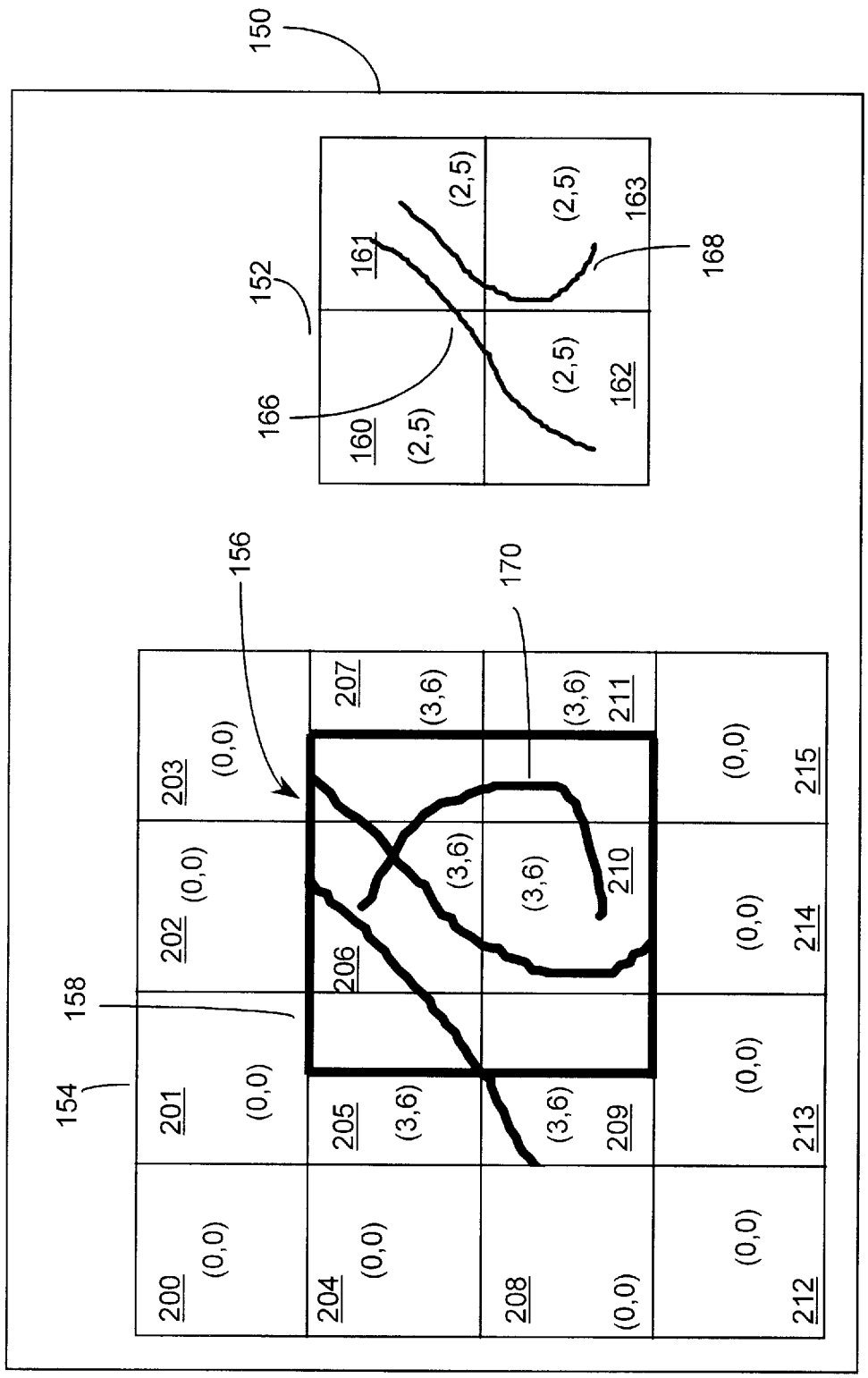
FIG. 6D is an illustration of the digital picture of FIG. 6C is with an additional painting stroke applied thereto.

In the example of FIG. 6D, the user has entered a third brush stroke 170. The tiles 205–207, 209–211 within the viewing portion 156 are modified accordingly, and, assuming that the third stroke has six points, the ages of the tiles are updated to (3,6). The other tiles in the higher resolution image, however, are not updated as they are not visible. Likewise, the tiles in the lower-resolution image 152 are not modified by the third stroke.

Figure 7:
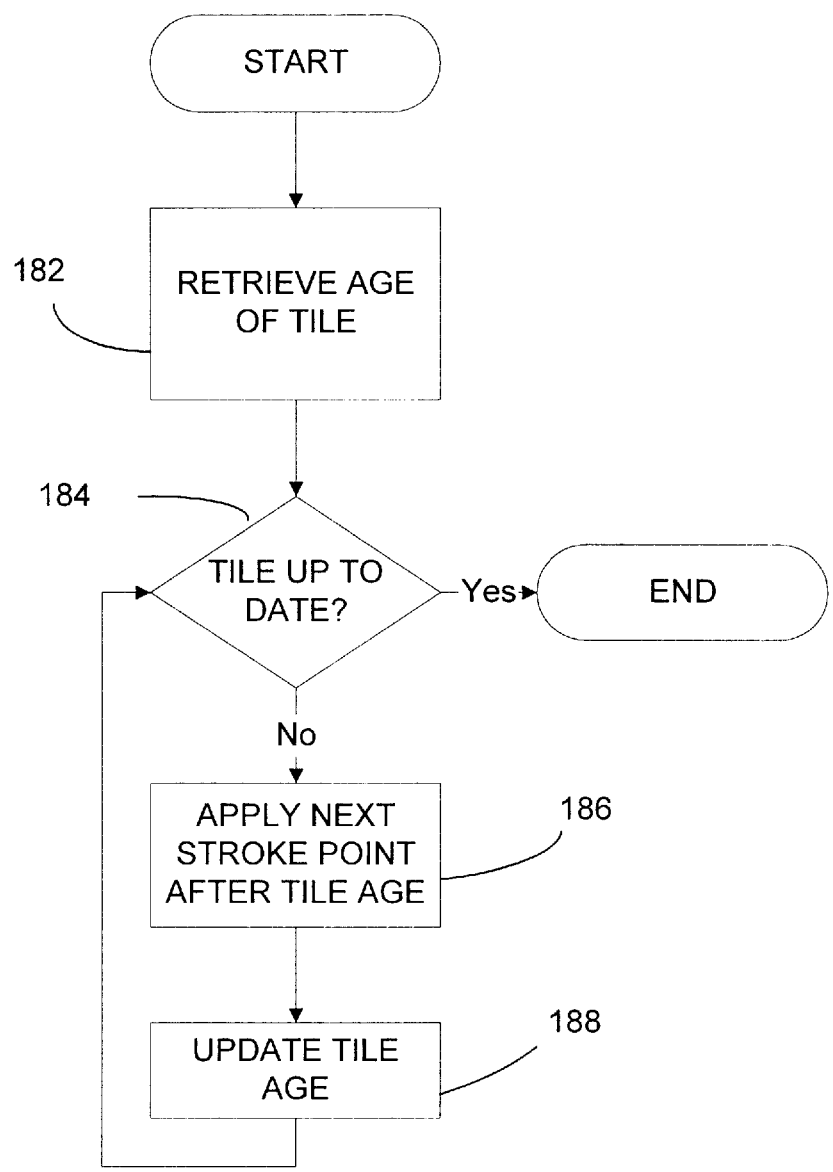
FIG. 7 is a flow diagram showing steps for updating a region in the viewing portion of the painted picture.

FIG. 7 shows steps for updating a tile when it is included (wholly or partially) in the viewing portion of the picture being painted. The age of the tile is retrieved from the age table (step 182), and compared to the last stroke point in the brush stroke table to determine whether the tile is up-to-date (step 184). If the tile is not up-to-date, the painting step corresponding to the next stroke point after step indicated by the age of the tile is applied to the tile (step 186). The age of the tile is then changed (step 188) to indicate the stoke point just applied. The application then loops back to step 184 to determine whether the tile is up-to-date. In this way, the painting steps younger than the original age of the tile are sequentially applied to the tile, and the age of the tile is updated accordingly.

The invention has thus far been illustrated using an embodiment in which a painted picture is stored as multi-resolution images. It will be appreciated that the invention can also be advantageously applied in an embodiment where a picture is stored as a single-resolution image. In other words, the lazy painting scheme of modifying a region of the picture being painted only when it becomes visible is equally applicable regardless of whether the picture is stored in the multi-resolution format or in the single-resolution format.

For example, a single-resolution painted picture may be stored in a computer file as a sequence of brush strokes instead of a bitmap of the final image. When the picture file is opened for further editing, the application may start from a blank image and applies the stored strokes only to the portions of the image that become visible to the user.

Figure 8:
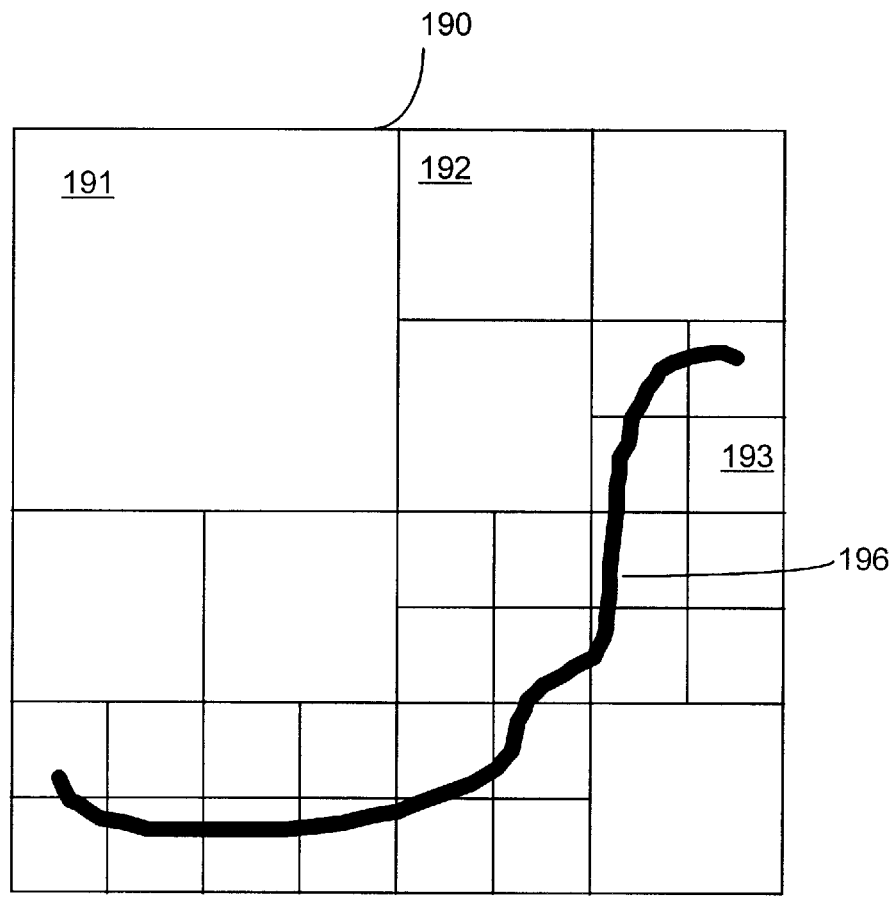
FIG. 8 is a schematic illustration of an image partitioned into tiles of different sizes.

In the embodiment described above, the images of the picture being painted are partitioned into rectangular tiles of a preselected size. Other ways of partitioning an images can also be used. For instance, the image may be partitioned into tiles of different sizes. An example of an image with such a partition is shown in FIG. 8. The image 190 is partitioned using a known "quadtree" partitioning scheme in which the image is successively subdivided to form quadrants of different sizes. More particularly, when a brush stroke 196 is applied to the image, the image is first divided into four quadrants. Each quadrant touched by the brush stroke is then subdivided into subquadrants. Each subquadrant touched by the brush stroke is then further divided into sub-subquadrants. The binary subdivision may continue until a predetermined cutoff depth is reached. In this way, the image is divided into tiles of different sizes. For example, the size of the tile 191 is four times that of the tile 192, and sixteen times that of the tile 193. The data structure for tracking the quadtree partition of an image should be known to those skilled in the art.

It will now be appreciated that what is provided is a method and apparatus for digital painting that uses a highly efficient way to handle painting strokes entered by the user. The invention is based on a lazy processing approach in which computer processing for modifying a region of the picture being painted is carried out only when that region is being viewed by the user. To that end, the painting strokes are recorded as an ordered sequence of small painting steps, and an age record is stored for each of the different regions of the picture for keeping track of the painting step in the ordered sequence that was last applied to the region. By modifying only those picture regions that need to be updated immediately, a graphics application embodying this invention is capable of providing significantly improved response to painting strokes entered by a user.

What is claimed is:

1. A method of painting a digital picture having a viewing portion displayed on a video display, comprising the steps of:

receiving a series of painting strokes;
   recording the series of painting strokes as an ordered sequence of sub-stroke painting steps;
   partitioning the digital picture as a plurality of individual regions;
   assigning an age to each of the individual regions, the age of each individual region indicating one substroke painting step in the ordered sequence that is last applied to the individual region;
   when an individual region is in the viewing portion of the digital picture, applying sub-stroke painting steps in the ordered sequence that are after the sub-stroke painting step indicated by the age of the individual region in the viewing portion; and
   updating the age of said individual region in the viewing portion.

2. A method as in claim 1, wherein the step of receiving detects movement of a pointing device which indicates traces of the painting strokes.

3. A method as in claim 1, wherein the individual regions of the digital picture are in the form of rectangular tiles each containing at least one pixel.

4. A method as in claim 3, wherein the tiles are of a fixed size.

5. A method as in claim 3, wherein the tiles are of different sizes.

6. A method as in claim 5, wherein the step of partitioning partitions the digital picture into tiles of different sized according to a quadtree partitioning scheme.

7. A method as in claim 1, wherein the digital picture includes correlated images of different resolutions.

8. A method as in claim 1, wherein the step of recording identifies each sub-stroke painting stroke by a stroke number and a sub-stroke number.

9. A method of painting a digital picture having a visible portion displayed on a video display, comprising the steps of:

receiving a series of painting strokes;
   recording the series of painting strokes as an ordered sequence of sub-stroke painting steps;
   partitioning the digital picture into a plurality of individual regions;
   assigning an age to each of the individual regions of the digital picture, the age of each individual region indicating one sub-stroke painting step in the ordered sequence that is last applied to the individual region;
   adjusting the viewing portion of the digital picture to cover a newly visible portion of the picture which includes individual regions that are previously not visible;
   for each individual region in the newly visible portion, applying sub-stroke painting steps in the ordered sequence that are after the sub-stroke painting step indicated by the age of said individual region in the newly visible portion;

updating the age of said individual region in the newly visible portion; and displaying said each individual region in the newly visible portion on the video display.

10. A method as in claim 9, wherein the step of receiving detects movement of a pointing device representing traces of the painting strokes.

11. A method as in claim 9, wherein the individual regions of the digital picture are in the form of rectangular tiles each containing at least one pixel.

12. A method as in claim 11, wherein the tiles are of a fixed size.

13. A method as in claim 11, wherein the tiles are of different sizes.

14. A method as in claim 9, wherein the digital picture includes correlated images of different resolutions.

15. A method as in claim 9, wherein the step of recording identifies each painting stroke by a stroke number and a sub-stroke number.

16. An apparatus for painting a digital picture according to a series of painting strokes comprising:

a video display for displaying a viewing portion of the digital picture;

a memory for storing the digital picture and recording the series of painting strokes, the digital picture being partitioned into a plurality of regions, the series of strokes recorded as an ordered sequence of sub-stroke painting steps, the memory further storing an age table containing an age for each region of the digital picture indicative of one sub-stroke painting step in the ordered sequence that is last applied to said each region;

a processor for modifying the digital picture according to the series of painting strokes, the processor identifying newly visible regions of the digital picture that are not previously included in the viewing portion, applying to each newly visible region sub-stroke painting steps that are after the sub-stroke painting step indicated by the age of said each newly visible region, and updating the age of said each newly visible region.

17. An apparatus as in claim 16, further including a pointing device coupled to the processor, the processor sensing movement of the pointing device indicating traces of the painting strokes.

18. An apparatus as in claim 16, wherein the regions of the digital picture are in the form of rectangular tiles each containing at least one pixel.

19. An apparatus as in claim 18, wherein the tiles are of a fixed size.

20. An apparatus as in claim 18, wherein the tiles are of different sizes.

21. An apparatus as in claim 16, wherein the digital picture includes correlated images of different resolutions.

22. An apparatus as in claim 16, wherein each painting stroke is stored in the memory as comprising consecutive points each corresponding to a painting step.

* * * * *

UNITED STATES PATENT AND TRADEMARK OFFICE
CERTIFICATE OF CORRECTION

PATENT NO. : 5,835,086
DATED : November 10, 1998
INVENTOR(S) : John Bradstreet and Arthur F. Champernowne It is certified that error appears in the above-identified patent and that said Letters Patent is hereby corrected as shown below:

In Column 2, line 49: "is with" should read --with--.

Signed and Sealed this

Fourth Day of May, 1999

Attest:

Q. TODD DICKINSON

*Attesting Officer*      *Acting Commissioner of Patents and Trademarks*